United States Patent [19]

Hunger

[11] Patent Number: 4,677,200
[45] Date of Patent: Jun. 30, 1987

[54] AMINO COMPOUNDS DERIVED FROM 5-ACETOACETYLAMINO-BENZIMIDAZOLONES

[75] Inventor: Klaus Hunger, Kelkheim, Fed. Rep. of Germany

[73] Assignee: Hoechst Aktiengesellschaft, Fed. Rep. of Germany

[21] Appl. No.: 719,256

[22] Filed: Apr. 3, 1985

[30] Foreign Application Priority Data

Apr. 5, 1984 [DE] Fed. Rep. of Germany ....... 3412731

[51] Int. Cl.$^4$ .................. C09B 29/01; C09B 29/32; C09B 31/10; D06P 1/44
[52] U.S. Cl. ..................... 534/742; 534/581; 534/600; 534/573
[58] Field of Search ..................... 534/742, 600

[56] References Cited

U.S. PATENT DOCUMENTS

| | | | |
|---|---|---|---|
| 2,092,143 | 9/1937 | Schweitzer | 534/600 |
| 2,138,991 | 12/1938 | Anderson et al. | 534/600 X |
| 4,370,269 | 1/1983 | Weingarten et al. | 534/742 |
| 4,476,052 | 10/1984 | Hunger et al. | 534/742 X |

FOREIGN PATENT DOCUMENTS

| | | | |
|---|---|---|---|
| 0061728 | 10/1982 | European Pat. Off. | 534/742 |
| 1266422 | 4/1968 | Fed. Rep. of Germany | 534/742 |
| 2821347 | 11/1978 | Fed. Rep. of Germany | 534/742 |
| 2224524 | 10/1974 | France | 534/742 |
| 2239495 | 2/1975 | France | 534/742 |
| 784781 | 10/1957 | United Kingdom | 534/742 |
| 2001667 | 2/1979 | United Kingdom | 534/742 |

OTHER PUBLICATIONS

Milz et al, Chemical Abstracts, vol. 87, #184191p (1977).

*Primary Examiner*—Floyd D. Higel
*Attorney, Agent, or Firm*—Connolly and Hutz

[57] ABSTRACT

The invention relates to aminoazo compounds of the formula I

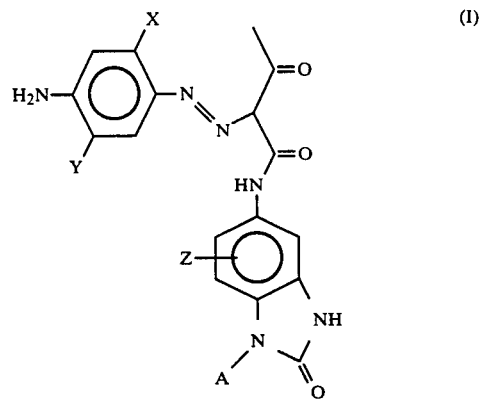

in which X and Y are identical or different and denote hydrogen, chlorine, bromine, methyl, methoxy, ethoxy, nitro, trifluoromethyl, carbomethoxy or carboethoxy, A represents hydrogen, methyl or ethyl, and Z in the 6- or 7-position of the heteroaromatic ring system is hydrogen, chlorine or bromine, methyl, methoxy, ethoxy, carbomethoxy, carboethoxy or nitro.

The compounds of the formula I are prepared by coupling a monodiazotized p-diaminobenzene substituted by X and Y analogously to the formula I with a 5-acetoacetylaminobenzimidazolone which carries the radicals A and Z analogously to the formula I. In the case where X, Y or Z does not denote a nitro group, it is possible to use in place of the p-diaminobenzene derivative a p-aminonitrobenzene derivative which is di-substituted by X and Y in the 2- and 5-positions. In this case, the product after diazotization and coupling is initially a nitro compound which can be converted by reduction into the aminoazo compound of the formula I.

The aminoazo compounds are used as starting materials for preparing disazo compounds, preferably disazo pigments, through diazotization in conventional manner and coupling onto compounds which are capable of coupling, for example onto 5-acetoacetylaminobenzimidazolones. The disazo pigments are distinguished by high tinctorial strength, excellent fastness to solvents and migration, and high thermostability.

2 Claims, No Drawings

AMINO COMPOUNDS DERIVED FROM 5-ACETOACETYLAMINO-BENZIMIDAZOLONES

The invention relates to aminoazo compounds which are used as starting materials for new disazo compounds, preferably disazo pigments.

The invention provides aminoazo compounds of the formula I

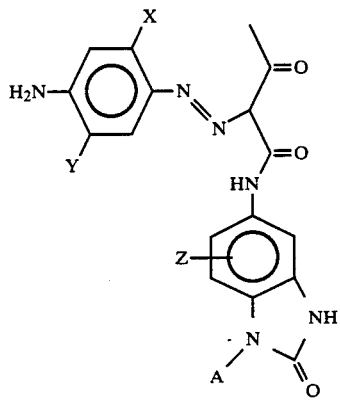

in which X and Y are identical or different and denote hydrogen, chlorine, bromine or a methyl, methoxy, ethoxy, nitro, trifluoromethyl, carbomethoxy or carboethoxy group, A represents hydrogen or a methyl or ethyl group, and Z in the 6- or 7-position of the heteroaromatic ring system is hydrogen, chlorine, bromine or a methyl, methoxy, ethoxy, carbomethoxy, carboethoxy or nitro group.

Preference is given to compounds of the formula I in which X and Y are identical or different and denote hydrogen, chlorine or a methyl, methoxy, ethoxy, carbomethoxy, carboethoxy or nitro group and A and Z are both hydrogen atoms, but in particular to compounds in which X and/or Y represent hydrogen, chlorine or a methyl, methoxy, carbomethoxy or nitro group and A and Z are both still hydrogen atoms.

The invention also provides a process for preparing the aminoazo compounds of the formula I which comprises taking compounds of the formula II

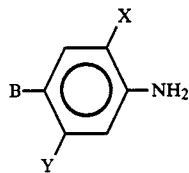

in which B is an amino or nitro group and X and Y are as defined above, and (a) in the case where B is an amino group, monodiazotizing these 1,4-diaminobenzenes in an aqueous medium and coupling the diazonium salt with a 5-acetoacetylaminobenzimidazolone compound of the formula III

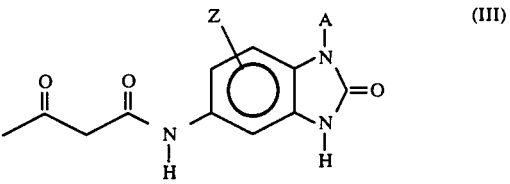

where A and Z are as defined in the case of the formula I, or (b) in the case where B is a nitro group and X and Y are as defined above but do not represent nitro substituents, diazotizing this 4-nitroaniline and coupling the diazonium compound onto a nitro-free benzimidazolone derivative of the formula III mentioned in (a), and reducing the resulting nitroazo compound of the formula IV

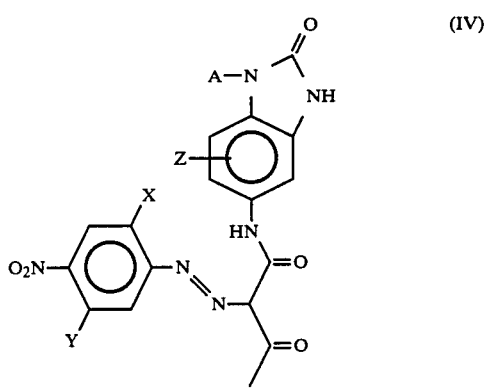

in which X, Y, Z and A are as defined in the case of the formula I, to the aminoazo compound I.

The monodiazotization of ring-halogenated 1,4-diaminobenzenes is known from German Pat. No. 586,355. In said process, the compounds are diazotized at one position with the amount of mineral acid and nitrous acid required for the diazotization of one amino group, and the resulting diazo compounds are precipitated in solid form by adding salt.

The monodiazotization of 1,4-diaminobenzenes of the formula II can also be effected, for example, in accordance with German Offenlegungsschrift No. 2,555,515, by diazotizing the 1,4-diaminobenzene in question in water or in a mixture of water and a water-miscible solvent, for example methanol, ethanol, acetone, dioxane, formamide, dimethylformamide, dimethyl sulfoxide, tetrahydrofuran, ethylene glycol, diethylene glycol dimethyl ether and/or N-methylpyrrolidone, within the pH range from 1 to 4, preferably 1.5 to 3.5, in the presence of mineral acids, for example sulfuric acid or phosphoric acid, in particular of hydrohalic acids, such as hydrochloric acid, or in the presence of low-molecular organic acids, for example oxalic acid or chloroacetic acid, in particular acetic acid, or in the presence of a mixture of a mineral acid with a low-molecular organic acid, for example a mixture of phosphoric acid and propionic acid, or hydrochloric acid and acetic acid, or sulfuric acid and acetic acid.

The temperature for the diazotization can vary zwithin a wide range, for example from −10° to +30° C. However, the preferred diazotization temperature is 0° to +5° C.

The time for the diazotization can also be varied widely. In general, 5 to 120 minutes are needed.

In the subsequent coupling, it can be of advantage, for example for obtaining a favorable particle size distribution and/or for affecting the rate of reaction, to add surface-active agents, for example nonionic, anionic or cationic dispersants.

Examples of these surface-active agents are anionic substances such as fatty acid taurides, fatty acid N-methyltaurides, fatty acid isethionates, alkylbenzenesulfonates, alkylnaphthalenesulfonates, alkylphenol polyglycol ether sulfates and fatty alcohol polyglycol ether sulfates, fatty acids, for example palmitic acid, stearic acid and oleic acid, soaps, for example alkali metal salts of fatty acids, naphthenic acid and resin acids, for example abietic acid, alkalisoluble resins, for example colophony-modified maleate resins, cationic substances, such as quaternary ammonium salts, N-oxides of tertiary amines or their salts, fatty amines and their ethoxylated derivatives, and nonionic substances such as fatty alcohol polyglycol ethers (ethoxylated fatty alcohols), fatty acid polyglycol esters, alkylphenol polyglycol ethers and dialkyl polyglycol ethers.

The surface-active agents can be added either alone or mixed. The amount can vary within wide limits, the quantity which is generally used being 0.1 to 20% by weight, preferably 5 to 10% by weight, relative to a 100% pigment yield.

It is advantageous to proceed with the coupling by dissolving the coupling component, preferably in aqueous alkali metal hydroxide solution, reprecipitating with acid and, finally, using the resulting suspension to carry out the coupling at 10° to 80°, preferably 15° to 35° C.

The coupling can also be carried out in the presence of organic solvents, for example glacial acetic acid, lower alkanols, dioxane, formamide, dimethylformamide, dimethyl sulfoxide, pyridine or N-methylpyrrolidone. The suspension obtained after the coupling is heated at 80° to 100° C. for 10 to 30 minutes, and the resulting pigment is filtered off with suction, is washed until salt-free, and is dried.

The reduction of nitroazo compounds of the formula IV, which, owing to their structures, have stable azo bridges, is generally effected by conventional methods, for example by reduction with iron or hydrosulfide or other reducing agents or catalytically with hydrogen. Suitable solvents in which to carry out the reduction are in addition to water, all organic solvents which are inert to reductions, for example alkanols, aprotic solvents, such as dimethylformamide, dimethyl sulfoxide, N-methylpyrrolidone, aromatic hydrocarbons, such as toluene and the various xylenes.

After the reduction has been carried out catalytically, for example with hydrogen/Raney nickel, the mixture is filtered to remove the solvent, the aminoazo compound is stirred at room temperature with aqueous hydrochloric acid until the metallic nickel has been converted into nickel chloride, and the solids left are then filtered off, are washed until salt-free and neutral, and are dried. In cases where the aminoazo compound is soluble in the solvents, the catalyst is filtered off after the reduction and the aminoazo compound is isolated.

The new aminoazo compounds are used as starting materials for the preparation of disazo compounds, preferably for the preparation of disazo pigments, through diazotization in conventional manner and coupling onto compounds which are capable of coupling, for example onto 5-acetoacetylaminobenzimidazolones. The disazo pigments obtained in this manner are distinguished by particularly good properties, such as high tinctorial strength, excellent fastness to solvents and migration, very good thermostability and light fastness.

In the following examples, the percentages are by weight.

EXAMPLES

1. Method (a) 10.8 g of 1,4-diaminobenzene were dissolved in 100 ml of water and 40 ml of 5N hydrochloric acid, and the solution was cooled down to 5° C. 50.3 ml of 2N sodium nitrite solution were added dropwise in the course of one hour. In the course of the addition the pH rose from 2 to 3.5, and at the end of the addition a slight nitrite excess was observed. The mixture was stirred for 30 minutes, and the batch was clarified with charcoal and kieselguhr.

24 g of 5-acetoacetylaminobenzimidazolone were dissolved in a mixture of 18 ml of 33% strength sodium hydroxide solution and 300 ml of water. The solution was brought to pH 9 by the dropwise addition of 10.5 ml of glacial acetic acid in 100 ml of water, and all of the coupling component came down as precipitate. The precipitate had added to it dropwise at 30° C. the solution of the diazo component in the course of 30 minutes, during which pH 9 was maintained by alternately adding a total of 200 mL of a 3% strength sodium carbonate solution. After the coupling reaction had ended, the mixture was brought to pH 7 with 2% strength hydrochloric acid and was heated at 95° C. for 30 minutes. The orange-colored precipitate was filtered off, was washed until salt-free and was dried, to leave 30.3 g (86.1% of theory) of an orange-colored powder of the formula

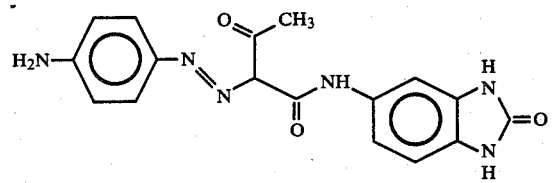

having a melting point of 288° C.

2. Method (b) 50 g of the 4-nitrophenylazo compound obtained by coupling diazotized 4-nitroaniline onto 5-acetoacetylaminobenzimidazolone was hydrogenated at 80° C. in 500 ml of N-methylpyrrolidone with 3 g of Raney nickel and 50 bar of hydrogen pressure. The orange-colored suspension was then diluted with N-methylpyrrolidone to a volume of 3 liters and was heated at 100° C. until a clear solution had formed, and the nickel catalyst was filtered off. The filtrate was concentrated at 80°–100° C. under reduced pressure to a volume of about 1 liter, and the orange-colored product was filtered off with suction, was washed with ethanol and was dried. Yield 43.7 g (94.8% of theory); melting point 288° C.

The methods according to the invention can be used to prepare further aminoazo compounds which are named in the following table where X, Y, A and Z occupy the positions indicated in the formula I:

| Example | Method | X | Y | A | Z | Mp. °C. | Yield (% of theory) |
|---|---|---|---|---|---|---|---|
| 3 | a | Cl | Cl | H | H | 320 | 83.1 |
| 4 | a, b | OCH$_3$ | OCH$_3$ | H | H | 274 | (a) 76.4  (b) 81.2 |
| 5 | a, b | Cl | H | H | H | 297 | (a) 89.6  (b) 95.4 |
| 6 | a, b | CH$_3$ | CH$_3$ | H | H | 298 | (a) 88.4  (b) 93.3 |
| 7 | b | OCH$_3$ | H | H | H | 282 | 87.3 |
| 8 | b | CH$_3$ | H | H | H | 265 | 69.5 |
| 9 | b | H | CF$_3$ | H | H | 305 | 85.2 |
| 10 | a | H | H | H | 6-Cl | 292 | 69.7 |
| 11 | a | H | H | CH$_3$ | H | 271 | 96.2 |
| 12 | a | Cl | Cl | H | 7-Cl | 282 | 96.2 |
| 13 | a | Cl | Cl | CH$_3$ | H | 282 | 91.6 |
| 14 | a | Cl | Cl | H | 6-Cl | 306 | 83.2 |
| 15 | b | OCH$_3$ | H | H | 6-Cl | 265 | 92.0 |
| 16 | b | CH$_3$ | CH$_3$ | H | 6-Cl | 255 | 90.7 |
| 17 | b | COOCH$_3$ | H | H | H | 284 | 98.7 |
| 18 | a | Cl | H | H | 7-Cl | 278 | 95.1 |
| 19 | b | CH$_3$ | H | CH$_3$ | H | 245 | 84.5 |
| 20 | b | Cl | H | CH$_3$ | H | 284 | 87.3 |
| 21 | b | Cl | H | H | 6-Cl | 278 | 79.8 |
| 22 | a | NO$_2$ | H | H | H | 304 | 98.2 |
| 23 | a | Cl | H | H | 6-OCH$_3$ | 282 | 96.0 |

I claim:
1. An aminoazo compound of the formula

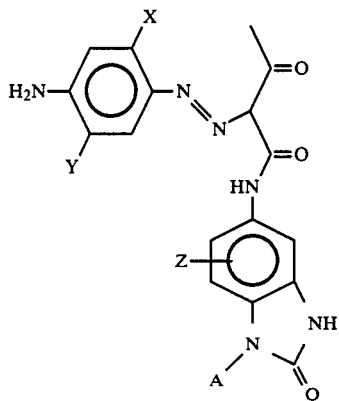

in which X and Y are indentical or different and denote hydrogen, chlorine, bromine, methyl, methoxy, ethoxy, nitro, trifluoromethyl, carbomethoxy or carboethoxy, A represents hydrogen, methyl or ethyl, and Z in the 6- or 7-position of the heteroaromatic ring system is hydrogen, chlorine, bromine, methyl, methoxy, ethoxy, carbomethoxy, carboethoxy or nitro.

2. An aminoazo compound as claimed in claim 1, wherein X and Y are identical or different and denote hydrogen, chlorine, methyl, methoxy, carbomethoxy or nitro and A and Z are both hydrogen.

* * * * *